(12) United States Patent
Schoenfeld et al.

(10) Patent No.: US 6,998,011 B2
(45) Date of Patent: Feb. 14, 2006

(54) EPOXY ADHESIVE HAVING IMPROVED IMPACT RESISTANCE

(75) Inventors: Rainer Schoenfeld, New Berlin, WI (US); James F. Hubert, Brookfield, WI (US); Murteza Erman, New Berlin, WI (US)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 10/388,304

(22) Filed: Mar. 13, 2003

(65) Prior Publication Data

US 2003/0196753 A1 Oct. 23, 2003

Related U.S. Application Data

(63) Continuation-in-part of application No. 10/098,963, filed on Mar. 15, 2002, now abandoned.

(51) Int. Cl.
  *C09J 4/02* (2006.01)

(52) U.S. Cl. .............. 156/331.4; 156/331.1; 525/111; 525/112; 525/113; 525/119; 525/524; 525/528; 521/135; 521/155; 521/178

(58) Field of Classification Search .......... 525/111, 525/112, 113, 119, 524, 528; 521/135, 155, 521/178; 156/331.1, 331.4
See application file for complete search history.

(56) References Cited

U.S. PATENT DOCUMENTS

| | | | |
|---|---|---|---|
| 3,297,745 A | 1/1967 | Fekete et al. ............... 260/471 |
| 4,360,653 A | 11/1982 | Stevens et al. ............. 526/301 |
| 4,390,662 A | 6/1983 | Ando et al. .................... 525/28 |
| 4,486,582 A | 12/1984 | Hefner, Jr. .................. 526/301 |
| 4,618,658 A | 10/1986 | Hefner, Jr. et al. ......... 525/454 |
| 4,719,268 A | 1/1988 | Hefner et al. .............. 525/454 |
| 5,030,698 A | 7/1991 | Muehaupt et al. .......... 525/423 |
| 5,084,532 A | 1/1992 | Schenkel et al. |
| 5,198,524 A | 3/1993 | Bush et al. .................... 528/87 |
| 5,278,257 A | 1/1994 | Muelhaupt et al. ......... 525/454 |
| 5,334,654 A | 8/1994 | Starner et al. .............. 524/849 |
| 5,700,891 A | 12/1997 | Huver et al. ................ 526/301 |
| 5,755,486 A | 5/1998 | Wycech ....................... 296/188 |
| 5,891,367 A | 4/1999 | Basheer et al. ............. 252/514 |
| 6,015,865 A | 1/2000 | Blank et al. ................. 525/524 |
| 6,270,600 B1 | 8/2001 | Wycech ....................... 156/79 |
| 6,332,731 B1 | 12/2001 | Wycech ....................... 403/171 |
| 6,776,869 B1 | 8/2004 | Schenkel et al. |
| 2001/0009952 A1 | 7/2001 | Tan et al. .................... 525/528 |
| 2003/0187154 A1 | 10/2003 | Schoenfeld et al. |

FOREIGN PATENT DOCUMENTS

| | | |
|---|---|---|
| CA | 1 330143 | 6/1994 |
| CA | 1 334700 | 3/1995 |
| WO | WO 0020483 | 9/1999 |
| WO | WO 0037554 | 12/1999 |
| WO | WO 0052086 | 2/2000 |
| WO | WO 0194492 | 12/2001 |

OTHER PUBLICATIONS

U.S. Appl. No. 10/867,652, filed Jun. 15, 2004, Schoenfeld et al.
U.S. Appl. No. 10/871,891, filed Jun. 18, 2004, Schoenfeld et al.
U.S. Appl. No. 10/808,992, filed Mar. 24, 2004, Schoenfeld et al.
U.S. Appl. No. 10/804,680, filed Mar. 19, 2004 Schenkel et al.

*Primary Examiner*—David J. Buttner
*Assistant Examiner*—Christopher Keehan
(74) *Attorney, Agent, or Firm*—Stephen D. Harper

(57) ABSTRACT

In the preparation of an improved adhesive composition, an epoxy-based prepolymer is obtained by the reaction of one or more epoxy resins with amino-terminated polyethers and/or carboxyl-terminated butadiene-nitrile rubbers. In one embodiment of the invention, both a solid epoxy resin and a liquid epoxy resin, each of which is a diglycidyl ether of a polyphenol such as bisphenol A, are used. The epoxy-based prepolymer is mixed with an acrylate-terminated urethane resin (preferably, one based on a polyol having a number average molecular weight of at least about 400) and a heat-activated latent curing agent to make an adhesive composition which can be pumpable at room temperature. Curable adhesives capable of expansion to about 100% with high impact resistance after curing may be obtained by inclusion of expanding agents such as expandable microspheres.

26 Claims, No Drawings

EPOXY ADHESIVE HAVING IMPROVED IMPACT RESISTANCE

CROSS REFERENCE TO RELATED APPLICATION

This application is a CIP of U.S. patent application Ser. No. 10/098,963, filed Mar. 15, 2002, now abandoned.

FIELD OF THE INVENTION

This invention relates to compositions useful as adhesives and more particularly to the preparation of epoxy-based adhesives with improved impact resistance capable of being employed with or without expansion agents.

DISCUSSION OF THE RELATED ART

Numerous compositions and processes are described in the art for making and using a wide variety of epoxy-based compositions and other resins and additives in an effort to improve the expansion, impact resistance and other key properties of adhesives useful in adhering, filling and making composite structures. For example, patents which describe components for the formulation of adhesive compositions and the use of such compositions to adhere various substrates to each other and to provide structural reinforcement include U.S. Pat. Nos. 5,334,654, 6,270,600, 6,332,731, 5,755,486, and 6,015,865. U.S. Pat. No. 5,278,257 describes a composition containing a) a copolymer based on at least one 1,3-diene and at least one polar, ethylenically unsaturated comonomer and b) a phenol-terminated polyurethane, polyurea, or polyurea-urethane. Compositions containing components a) and b) as well as an epoxide resin are also described. U.S. Pat. No. 5,198,524 describes moisture-curing acrylate/epoxy hybrid adhesives containing a mixture of acrylate and epoxy with a tri- or tetrafunctional ketimine as a curing agent. The epoxy may be reacted with a chain extender having amine functionality, with the intermediate thereby obtained being further reacted with an acrylated urethane. Nevertheless, significant problems remain with respect to the preparation of high impact epoxy based adhesives, especially when such adhesives are employed in an expanded state. Further, problems have existed in preparing high impact, expandable adhesives which can be flowed to the application site by pumping, for example, at ambient or moderately elevated temperatures.

SUMMARY OF THE INVENTION

We have discovered that unexpectedly improved adhesive formulations can be prepared by reacting a polyepoxide resin having at least about two 1,2-epoxy groups per molecule with an amino-terminated polyether and/or a carboxyl-containing 1,3-diene/polar ethylenically unsaturated comonomer resin (such as a carboxyl-terminated butadiene-nitrile rubber) to produce an epoxy-based prepolymer which is then admixed with an acrylate terminated urethane resin as defined herein (preferably, the reaction product of an isocyanate terminated urethane prepolymer and an isocyanate reactive acrylate or methacrylate), a latent curing agent capable of being activated by heat, and, optionally, fillers, coloring agents, expanding (blowing) agents, or other adjuvants of the type known in the art. When applied to a substrate or carrier and cured by heating, the adhesive results in a product having improved impact toughness and/or impact resistance useful in a wide variety of applications.

In a preferred embodiment, a curable adhesive is formulated which comprises:

A) an epoxy-based prepolymer obtained by reacting
  (a) at least one epoxy resin prepared from bisphenol A or bisphenol F and epichlorohydrin having an epoxide equivalent weight of from about 150 to about 700; and
  (b) at least one co-reactant selected from the group consisting of amino-terminated polyalkylene glycols (preferably, polyethylene and polypropylene glycols terminated with amine groups), carboxyl-terminated butadiene-nitrile resins, and mixtures thereof;
B) at least one acrylate-terminated urethane resin derived from a polyol having a number average molecular weight of at least about 400, a polyfunctional isocyanate, and an isocyanate-reactive acrylate and/or methacrylate; and
C) at least one heat-activated latent curing agent.

DETAILED DESCRIPTION OF THE INVENTION

In a further preferred embodiment, the epoxy-based prepolymers useful in producing adhesive compositions of this invention are prepared in accordance with U.S. Pat. No. 6,015,865, which is hereby incorporated by reference in its entirety. In this preferred embodiment the epoxy-based prepolymer component is obtained by reacting a) an epoxy resin which is solid at room temperature;
  b) an epoxy resin which is liquid at room temperature; and
  c) an amino-terminated polyether component selected from the group consisting of linear amino-terminated polyethylene glycols (ATPEGs), and linear and trifunctional amino-terminated polypropylene glycols (ATPPGs), the epoxy resins a) and b) being used in such a quantity that an excess of epoxide groups over the amino groups present in c) is ensured.

At this point mention is made that the components a), b) and c) can, in each case, also be mixtures of two or more compounds of the given type.

This epoxy-based prepolymer can be modified by adding other modified epoxy resins such as:
  i) adducts of dimeric fatty acids having varying molecular weights with epoxy resins of the diglycidyl ether type of bisphenol A or F (DGEBA or DGEBF) (e.g. Epikote® or EPON® 872),
  ii) adducts of carboxyl-terminated butadiene-nitrile rubber (CTBN) (Hycar® 1300×8, 1300×13; Struktol®) with DGEBA or DGEBF so that, even at high temperatures (up to +90° C.) and under ageing conditions (including exposure to moisture), they exhibit permanent strength. Preferably 4 to 40, particularly 5 to 25, e.g. 20%, of the epoxide equivalents (EEW) of the total epoxy resin component may be replaced by such adducts.

When reacting the epoxy resins with the amino-terminated polyether, an excess of epoxy groups over the amino groups is preferably employed so that the latter react completely with epoxide groups. Typically, there is a 1.5 to 10-fold excess, for example, a 3.5-fold excess of EEW over the active hydrogen equivalents (AHEW) of the amines. The rate of reaction may be accelerated by any suitable catalyst such as, for example, phosphines, amines, phosphonium salts, ammonium salts, or the like.

Carboxyl-containing resins which are copolymers of 1,3-dienes and polar ethylenically unsaturated monomers may also be used to prepare the epoxy-based prepolymer, either alone or in combination with one or more amino-terminated polyethers. The 1,3-diene is most preferably butadiene. The polar ethylenically unsaturated monomer is preferably acrylonitrile, although other suitable comonomers include methacrylonitrile, acrylic acid, methacrylic acid, esters and amides of acrylic and methacrylic acid, vinyl esters, and the like. Additional comonomers such as non-polar ethylenically unsaturated monomers may also be present. The carboxyl functionality may be introduced onto these resins by any suitable means. The composition of the carboxyl-containing resin should be selected such that the glass transition temperature of the resin is less than about −30 degrees C. Especially preferred for use are the carboxyl-terminated butadiene-nitrile rubbers, such as those for example sold under the HYCAR trademark by B.F. Goodrich (in particular, HYCAR CTBN 1300×8, HYCAR CTBN 1300×13, and HYCAR CTBN 1300×15). The carboxyl-terminated butadiene-nitrile rubber preferably has a number average molecular weight of from about 2000 to about 5000 and an acrylonitrile content of from about 10 to about 30 weight percent. The carboxyl-containing resins may be reacted with one or more epoxy resins to form the epoxy-based prepolymer by any suitable method, such as heating these components under conditions effective to cause reaction while avoiding complete curing of the epoxy resins. A catalyst such as an amine, phosphine, ammonium salt, phosphonium salt, or the like may be utilized.

The epoxy-based prepolymer is then admixed with an acrylate terminated urethane resin as described herein and a latent curing agent (as well as with other desired additives) to prepare an improved curable adhesive for use in expanded or non-expanded applications where high impact resistance is needed.

The adhesive made according to this invention exhibits high T-peel and impact peel strengths in the temperature range of −40° C. to +90° C. In the cured state, these adhesives display the degree of flexibility which is necessary especially in the manufacture of automobiles and trucks. The flexibility of the resin matrix may be adjusted by using amino-terminated polyether of varying functionality (bi- or trifunctional) and variable chain-length, and by varying the ratio of amino-terminated polyether to epoxy resin. The impact toughness and flowability at ambient temperatures may be adjusted by varying the ratio of epoxy-based prepolymer to the acrylate functional urethane resin or resins.

The weight ratio of epoxy-based prepolymer to acrylate terminated urethane resin is preferably between about 50:1 to about 1:1—and most preferably between about 20:1 to about 4:1.

Preferably, the molar amount of acrylate groups in the adhesive is less than 10% (more preferably, less than 5%) of the total molar amount of acrylate and epoxy groups in the adhesive. In contrast, the compositions described in U.S. Pat. No. 5,198,524 require acrylate levels of at least 10 mole %, preferably at least 30 mole %.

Surprisingly, the curable adhesives made by combining the epoxy-based prepolymer with the acrylate terminated urethane resin and a latent curing agent may be formulated to be pumpable at ambient temperatures or slightly higher, e.g., between about 10 to about 50 degrees C., preferably between about 20 and about 40 degrees C. and have improved peel strengths both in the expanded and unexpanded cured state over the prior art.

In general, a large number of polyepoxides having at least two 1,2-epoxy groups per molecule are suitable as epoxy resins for making the epoxy-based prepolymer employed in this invention. The polyepoxides may be saturated, unsaturated, cyclic or acyclic, aliphatic, alicyclic, aromatic or heterocyclic polyepoxide compounds. Examples of suitable polyepoxides include the polyglycidyl ethers, which are prepared by reaction of epichlorohydrin or epibromohydrin with a polyphenol in the presence of alkali. Suitable polyphenols therefor are, for example, resorcinol, pyrocatechol, hydroquinone, bisphenol A (bis(4-hydroxyphenyl)-2,2-propane), bisphenol F (bis(4-hydroxyphenyl)methane), bis(4-hydroxyphenyl)-1,1-isobutane, 4,4'-dihydroxybenzophenone, bis(4-hydroxyphenyl)-1,1-ethane, and 1,5-hydroxynaphthalene. Other suitable polyphenols as the basis for the polyglycidyl ethers are the known condensation products of phenol and formaldehyde or acetaldehyde of the novolak resin-type.

Other polyepoxides that are in principle suitable are the polyglycidyl ethers of polyalcohols or diamines. Such polyglycidyl ethers are derived from polyalcohols, such as ethylene glycol, diethylene glycol, triethylene glycol, 1,2-propylene glycol, 1,4-butylene glycol, triethylene glycol, 1,5-pentanediol, 1,6-hexanediol or trimethylolpropane.

Other polyepoxides are polyglycidyl esters of polycarboxylic acids, for example, reaction products of glycidol or epichlorohydrin with aliphatic or aromatic polycarboxylic acids, such as oxalic acid, succinic acid, glutaric acid, terephthalic acid or a dimeric fatty acid.

Other epoxides are derived from the epoxidation products of olefinically-unsaturated cycloaliphatic compounds or from natural oils and fats.

Particular preference is given to the epoxy resins derived by reaction of bisphenol A or bisphenol F and epichlorohydrin, the liquid epoxy resins preferably being based on bisphenol A and having a sufficiently low molecular weight. The epoxy resins that are liquid at room temperature generally have epoxy equivalent weights of from 150 to about 480; particular preference is given to an epoxy equivalent weight range of from 182 to 350. Liquid epoxy resins of this type may be utilized in unreacted form as additional components of the curable adhesives of the present invention.

The epoxy resins that are solid at room temperature are likewise obtainable from polyphenols and epichlorohydrin; particular preference is given to those based on bisphenol A or bisphenol F having a melting point of from 45 to 130 degrees C., preferably from 50 to 80 degrees C. They differ from the liquid epoxy resins substantially by the higher molecular weight thereof, as a result of which they become solid at room temperature. According to the present invention, the solid epoxy resins have an epoxy equivalent weight of $\geq 400$; particular preference is given to an epoxy equivalent weight of from 450 to about 900.

The curable adhesives of the present invention may additionally comprise one or more further flexibility-conferring components such as those conventionally used for such purpose in the epoxy resin art. Particular preference is given, however, to the adducts (reaction products) of polymeric fatty acids, especially of dimeric fatty acids, with epoxides such as epichlorohydrin, glycidol or, especially, the diglycidyl ethers of polyphenols such as bisphenol A (DGBA). Also preferred for use (especially where the epoxy-based prepolymer has been obtained by reacting an epoxy resin with an amino-terminated polyether) are the adducts (reaction products) of carboxy-terminated butadiene-nitrile rubbers with epoxy resins (especially liquid diglycidyl ethers of polyphenols such as bisphenol A). These further flexibility-conferring components may be admixed with the epoxy-based prepolymer following preparation of such prepolymer or, in a preferred embodiment, be present during reaction of the materials used to prepare the epoxy-based prepolymer.

Since the curable adhesives of the present invention are preferably one-part or single-component compositions and are to be cured at elevated temperature, they also contain one or more hardeners capable of accomplishing cross-linking or curing of certain of the adhesive components when the adhesive is heated to a temperature well in excess of room temperature. That is, the hardener is activated by heating, in contrast to the ketimine hardeners of U.S. Pat. No. 5,198,524, which are activated by exposure to moisture. The hardener may function in a catalytic manner or, in preferred embodiments of the invention, participate directly in the curing process by reaction with one or more of the adhesive components.

There may be used as thermally-activatable or latent hardeners for the adhesive compositions of the present invention, for example, guanidines, substituted guanidines, substituted ureas, melamine resins, guanamine derivatives, cyclic tertiary amines, aromatic amines and/or mixtures thereof. The hardeners may be involved stoichiometrically in the hardening reaction; they may, however, also be catalytically active. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and, more especially, cyanoguanidine (dicyandiamide). Representatives of suitable guanamine derivatives which may be mentioned are alkylated benzoguanamine resins, benzoguanamine resins or methoxymethylethoxymethylbenzoguanamine. For single-component, thermosetting adhesives, the selection criterion is, of course, the low solubility of those substances at room temperature in the resin system, so that solid, finely ground hardeners are preferred; dicyandiamide is especially suitable. Good storage stability of the composition is thereby ensured.

In addition to or instead of the above-mentioned hardeners, catalytically-active substituted ureas may be used. They are especially p-chlorophenyl-N,N-dimethylurea (monuron), 3-phenyl-1,1-dimethylurea (fenuron) or 3,4-dichlorophenyl-N,N-dimethylurea (diuron). In principle, catalytically active tertiary acryl- or alkyl-amines, such as benzyldimethylamine, tris(dimethylamino)phenol, piperidine or piperidine derivatives, may also be used, but they are in many cases too highly soluble in the adhesive system, so that usable storage stability of the single-component system is not achieved. Various imidazole derivatives, preferably solid imidazole derivatives, may also be used as catalytically-active accelerators. Examples which may be mentioned are 2-ethyl-2-methylimidazole, N-butylimidazole, benzimidazole and N—$C_1$ to $C_{12}$-alkylimidazoles or N-arylimidazoles. Particular preference is given to the use of a combination of hardener and accelerator in the form of so-called accelerated dicyandiamides in finely ground form. The separate addition of catalytically-active accelerators to the epoxy hardening system is thus not necessary.

The adhesives according to the present invention may also contain known fillers such as the various ground or precipitated chalks, carbon black, calcium magnesium carbonates, barite and, especially, silicate-like fillers of the aluminum magnesium calcium silicate type, for example wollastonite and chlorite.

When it is desirable to make lightweight (low density) structures, the adhesives preferably contain in addition to the above-mentioned fillers so-called lightweight fillers, which are selected from hollow glass spheres, flue ash, mica, hollow plastic spheres based on phenol resins, epoxy resins or polyesters, hollow ceramic spheres, or organic lightweight fillers of natural origin, such as ground nutshells, for example the shells of cashew nuts, coconuts or groundnut shells, as well as cork powder or coke powder. Particular preference is given to such lightweight fillers based on hollow glass or ceramic microspheres.

In another embodiment, the curable adhesive composition additionally contains fibers based on aramide fibers, carbon fibers, glass fibers, polyamide fibers, polyethylene fibers or polyester fibers, those fibers preferably being pulp fibers or staple fibers having a fiber length of from 0.5 to 6 mm and a diameter of from 5 to 20 microns. Particular preference is given to polyamide fibers of the aramide fiber type, or to polyester fibers.

In one particularly preferred embodiment of the invention, the curable adhesive contains one or more expanding agents (sometimes referred to in the art as blowing agents). The expandable properties of the resulting adhesive are particularly useful in applications where the complete filling of a gap or cavity in a part or member is critical in order to maintain maximum structural integrity of the part or member. The foamed cured adhesive has improved fracture toughness, thereby imparting impact resistance to the assembly. If the curable adhesive is to be utilized as a one-part or single-component composition, the expanding agent is preferably a latent expanding agent which causes expansion or foaming of the adhesive only when heated to a temperature significantly above room temperature (typically, a temperature which is in the range at which curing of the adhesive is also initiated). Although any suitable expanding agent may be employed, such as a chemical expanding agent, e.g., azo compounds, hydrazides and the like, particular preference is given to expandable microspheres. Expandable microspheres generally comprise small diameter polymeric shells or bubbles which encapsulate one or more volatile substances such as light hydrocarbons or halocarbons. The outer shells are usually thermoplastic in character to permit softening and expansion of the microspheres when heated due to volatilization of the substances trapped within the shells. The polymers used in the shells may be linear, branched, or cross-linked and may be comprised of, for example, acrylic resins, styrenic resins, polyvinylidene chloride, nitrile polymers, and the like. Typically, the average particle size of the expandable microspheres is in the range of from about 5 to about 100 microns. Suitable expandable microspheres are commercially available under the trademark names DUALITE and EXPANCEL from Pierce & Stevens and Casco Nobel, respectively. In one embodiment of the invention, the type and amount of expanding agent(s) are selected such that the curable adhesive expands in volume between about 90% and about 130% when heated and cured.

The adhesive compositions according to the present invention may also contain other common adjuvants and additives, such as plasticizers, reactive and/or non-reactive diluents, flow auxiliaries, wetting agents, tackifiers, flame retardants, thixotropic and/or rheology control agents, ageing and/or corrosion inhibitors, stabilizers and/or coloring pigments. Depending on the requirements made of the adhesive application with respect to its processing properties, its flexibility, the required rigidifying action and the adhesive bond to the substrates, the relative proportions of the individual components may vary within comparatively wide limits. Typical ranges for the main components of the curable adhesive of the present invention are as follows:

| | |
|---|---|
| a) epoxy-based prepolymer | from 10 to 70 wt. % |
| b) acrylate-terminated urethane | from 1 to 15 wt. % |
| c) liquid epoxy resins | from 10 to 50 wt. % |
| d) hardener/accelerator | from 0.5 to 10 wt. % |
| e) expanding agent | from 0 to 5 wt. % |
| f) lightweight filler | from 0 to 50 wt. % |
| g) fillers | from 3 to 30 wt. % |
| h) fibers | from 0 to 5 wt. % |
| i) pigments | from 0 to 1 wt. % |

In the cured state, one or more of the following improvements may be achieved as compared with the prior art:

higher impact resistance or toughness in expanded and unexpanded applications improved flow characteristics at ambient temperatures which permit pumping to the worksite at temperatures well below cure temperatures higher resistance to pressure lower brittleness improved resistance to cold and heat reduced temperature dependence of the resistance to pressure from −30° C. to +90° C.

constant force level over the deformation path reduction in density (specific weight)

low water absorption

In the preparation of the epoxy-based prepolymer, the following compounds may, for example, be used as amino-terminated polyethylene glycols (ATPEG) or polypropylene glycols (ATPPG):

1. linear amino-terminated polyethylene glycols (ATPEG) having the formula:

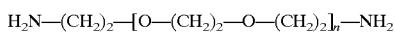

in which n preferably is 17 to 27.

2. linear amino-terminated polypropylene glycols (ATPPG) having the formula:

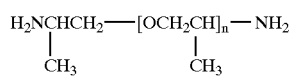

in which n preferably is 5 to 100. They are obtainable from Huntsman Chemical under the trade name Jeffamine® (D-series).

| Jeffamine ® Type | n | approx. molecular weight |
|---|---|---|
| D-400 | 5–6 | 400 |
| D-2000 | 33 | 2000 |
| D-4000 | 68 | 4000 |

3. trifunctional compounds having the formula:

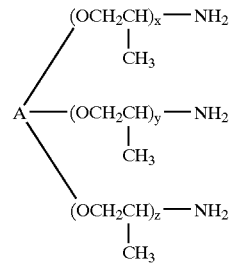

in which A is

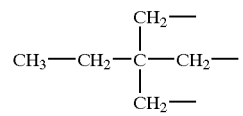

or a

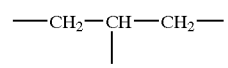

group and x, y and z independently of each other are 1 to 40 and x+y+z is preferably >6. They are obtainable from Huntsman Chemical under the trade name Jeffamine® (T-series).

| Jeffamine ® Type | A (initiator) | approx. molecular weight |
|---|---|---|
| T-403 | trimethylol propane | 440 |
| T-3000 | glycerin | 3000 |
| T-5000 | glycerin | 5000 |

Amino-terminated polyalkylene glycols containing both oxyethylene and oxypropylene repeating units may also be utilized as the amino-terminated polyether. Preferably, the amino-terminated polyether contains at least two amine groups per molecule. Preferably, the amine groups are primary amine groups. The amino-terminated polyether is preferably aliphatic. In addition to the aforedescribed amino-terminated polyethylene glycols, polypropylene glycols, and mixed polyethylene-propylene glycols, other aliphatic polyethers containing terminal amine groups such as amino-terminated polytetramethylene glycols or amino-terminated polybutylene glycols or mixed polypropylene-butylene glycols may be used.

As already mentioned, the properties of the curable adhesive can be controlled by varying the ratios of the resin components especially the ratio of the epoxy-based prepolymer and the acylate terminated urethane resin according to the present invention. Referring to the epoxy-based prepolymer in a preferred embodiment, 0.5 to 1 equivalent (30 to 50 wt-%) of epoxy resin a) which is solid at room temperature and 0.5 to 1 equivalent (10 to 25 wt-%) of epoxy resin b) which is liquid at room temperature are reacted with 0.125 to 0.5 equivalent (35 to 50 wt-%) of the amino-terminated polyethylene or polypropylene glycols, it being possible for 0.5 to 10 wt-% to be a trifunctional ATPPG. The heat-resistance of the curable adhesive can be further improved by adding dimeric acid and/or butadiene-nitrile rubber/DGEBA or DGEBF adducts. More specifically, the epoxy-based prepolymer can be modified by adding other modified epoxy resins such as:

i) adducts of dimeric fatty acids having varying molecular weights with epoxy resins of the diglycidyl ether type of bisphenol A or F (DGEBA or DGEBF) (e.g. Epikote® or EPONO® 872); and/or ii) adducts of carboxyl-terminated butadiene-nitrile rubber (CTBN) (Hycar® 1300×8, 1300×13; Struktol®) with DGEBA or DGEBF.

The adducts of type ii) may be used by themselves as the epoxy-based prepolymer component of the present invention.

When reacting the epoxy resins with the ATPEG/ATPPG, an excess of epoxy groups over the amino groups is used so that the latter react completely with epoxide groups. Typically, there is a 1.5 to 10-fold excess, for example a 3.5-fold excess of EEW over the active hydrogen equivalents (AHEW) of the amino-terminated polyether. In preparing the curable adhesive according to the present invention, the epoxy-based prepolymer component preferably is initially prepared in a first stage. To this end, preferably, the epoxy resins (such as, for example, solid epoxy resin a) and the liquid epoxy resin b)) are reacted with the amino-terminated polyether c) in the desired ratio. The reaction preferably is carried out at high temperature, preferably at 90 to 130° C., for example at approximately 120° C., for a duration of e.g. three hours.

The resultant epoxy-based prepolymer may be formulated to be solid or viscous at room temperature. It can be directly further processed by admixture with the acrylate terminated urethane resin and latent curing agent to obtain the curable adhesive according to this invention. However, it is also possible to prepare the epoxy-based prepolymer in advance and to store it until further processing. For further processing, first of all it may be necessary to heat the epoxy-based prepolymer in order to lower its viscosity to such a degree that it can be mixed with the other constituents of the curable adhesive. The prepolymer is preferably heated to a temperature above 50° C., for example 60 to 110° C., particularly 70 to 95° C. Then the other modified resins including the acrylate terminated urethane resin are added and homogeneously mixed. It must be ensured that heating is not carried out to a temperature at which the added latent curing agent would be activated. For heating the epoxy-based prepolymer and mixing with the other constituents of the curable adhesive, a heated kneader or planetary mixer is suitably used. It is preferred to incorporate the latent curing agent in the mixture last after the other constituents. It is further preferred to cool the mixture, prior to adding the latent curing agent, to a temperature at the lower limit of the temperature range which is suitable for processing.

In accordance with this invention, the epoxy-based prepolymer prepared as described above is mixed with an acrylate terminated urethane resin and more preferably with one or more acrylate terminated urethanes such as those described in U.S. Pat. Nos. 3,297,745; 4,360,653; 4,390,662; 4,719,268; 4,486,582; 4,618,658; 5,334,654; and 5,700,891 which are hereby incorporated by reference in their entirety. Acrylate-terminated urethane resins comprise the reaction product of an isocyanate terminated urethane prepolymer and an isocyanate reactive acrylate and/or methacrylate. Isocyanate terminated prepolymers are prepared by reacting a polyfunctional isocyanate, typically an aromatic diisocyanate, with a polyol, preferably a long chain hydroxyl-terminated polyether or polyester polyol, such as the ethylene and propylene oxide adducts of $C_2$ to $C_4$ polyalcohols, polytetramethylene glycol (polyTHF), and polycaprolactone. For enhanced flexibilization of the cured adhesive, the molecular number average weight of the polyol should range from about 400 to 4000, preferably 700 to 2000. Acrylate terminated urethane resins utilizing a polyol having a number average molecular weight of less than 1000 generally are extremely viscous. Higher molecular weight polyols tend to cause premature phase separation in the formulated adhesive leading to poor physical properties. The preferred isocyanate-terminated urethane prepolymer is prepared by any known means, for example, a 2000 mw polypropylene glycol may be reacted with an 80/20 2,4/2,6-toluenediisocyanate mixture. Any other polyisocyanate such as methylenediphenyldiisocyanate (MDI), isophoronediisocyanate, (IPDI) or paraphenylenediisocyanate (PPDI) is also suitable.

The isocyanate-reactive acrylates and methacrylates ("(meth)acrylates") typically used to prepare the acrylate terminated urethane prepolymers are hydroxy alkylacrylates and methacrylates and these include: hydroxyacrylates such as hydroxyethyl acrylate or methacrylate, hydroxypropyl acrylate or methacrylate, hydroxypentyl acrylate or methacrylate, 2-hydroxyethyl acrylate, 2-hydroxyethyl hexyl methacrylate, hydroxybutyl methacrylate and the like. Typically the ester portion of the acrylate or methacrylate is from a $C_2$-$C_8$ alcohol. Mixtures of different (meth)acrylates may be used.

Additional materials which can be used to prepare substances which we choose to describe as included within the definition of acrylate-terminated urethane resins include the following:

1) prepolymers having number average molecular weights of 250–10,000, preferably 700–4000, and having glass transition temperatures below about 10 degrees C., preferably below about minus 10 degrees C. The average functionality of these prepolymers is at least 2, preferably 2 to 6 and particularly preferably 2 to 3. The terminal functional groups of the prepolymer are isocyanate-reactive and may be amino or hydroxyl or carboxyl or mercapto, preferably, hydroxyl.

Particularly preferred prepolymers include linear and branched polypropylene glycols having number average molecular weights about 700 to about 4000; linear and branched polytetrahydrofurans having number average molecular weights between about 700 and about 4000; linear and branched poly(1,2-buyleneoxide) having number average molecular weights between about 700 and about 4000; and hydroxyl-terminated polyesters having number average molecular weights between about 700 and about 4000.

2) polyisocyanates, preferably diisocyanates or triisocyanates such as isophonoronediisocyanate, methylenediphenyldiisocyanate, toluenediisocyanate, hexamethylenediisocyanate, tetramethylxylylenediisocyanate, and the like.

3) isocyanate-reactive acrylates or methacylates, preferably hydroxyacrylates or -methacrylates such as hydroxyethylacrylate, hydroxypropylacrylate, hydroxyethylmethacrylate, hydroxypropylmethacylate, and the like.

Chain lengtheners such as diols and triols like 1,4 butanediol, 1,1,1-trimethylolpropane, glycerol, 1,2,6-hexanetriol, pentaerythritol and the like optionally may be employed in combination with the polyol(s), preferably, from 0.01 to about 5% by weight. When triol chain lengtheners, as described above, are added during this reaction and a suitable amount of polyisocyanate is used, branched NCO-tipped prepolymers are produced. Diol chain lengtheners can be used to control the molecular weight of the resulting prepolymer. This NCO-functional polymer is then reacted with the NCO-reactive acrylate or methacrylate to yield materials which are described for the purposes of this invention as acrylate-terminated urethane resins.

In another embodiment within the scope of this invention, the acrylate-terminated urethane resins as described herein may also be employed as an adduct onto an epoxy resin (e.g., the acrylate-terminated urethane resin is reacted with an epoxy resin before being combined with other components of the curable adhesive).

It should be further understood that in yet another embodiment within the scope of the present invention, an acrylate terminated urethane resin is employed to produce a curable adhesive composition without employing the amine-terminated polyether materials described above by admixing an epoxide resin having at least two 1,2-epoxide groups per molecule as described herein, a copolymer based on at least one 1,3-diene and at least one polar, ethylenically unsaturated comonomer, such as acrylonitrile, methacrylonitrile, acrylamide, methacrylamide, acrylic acid, or esters of acrylic or methacrylic acid with $C_1$–$C_6$ alcohols and a heat-activated latent curing agent as described herein.

The reactive adhesive according to the invention is suitable for gluing or adhering parts made of different materials. It is preferably used for the gluing of metal parts and particularly for the gluing of steel sheets. These can also be electro-galvanized, hot-dip galvanized or zinc/nickel-coated steel sheets, for example.

The adhesive may be deposited in the form of a melt on one side, i.e., onto one of the two parts which are to be glued together. In one embodiment of the invention, the adhesive is formulated so as to function as a hot melt; that is, an adhesive which is solid at room temperature, but capable of being converted to a pumpable or flowable material when heated to a temperature above room temperature. In another embodiment, the curable adhesive composition of this invention is formulated to be capable of being flowed or pumped to the work site at ambient temperatures or slightly above since, in most applications, it is preferable to ensure that the adhesive is heated only up to a temperature at which the latent curing agent is not yet activated. In yet another embodiment, the curable adhesive is formulated (by inclusion of a finely divided thermoplastic or by use of multiple curatives having different activation temperatures, for example) such that the curing process proceeds in two or more stages (partial curing at a first temperature, complete curing at a second, higher temperature). The two parts are joined together, preferably immediately after deposition of the adhesive mass, thereby provisionally bonding the two parts to each other.

The resultant bond preferably already has sufficient strength so that the still uncured adhesive is not readily washed out, as might otherwise occur, for example, if the metal sheets which are provisionally bonded to each other are treated for de-greasing purposes in a wash bath and then in a phosphating bath.

The adhesive is preferably finally cured in an oven at a temperature which lies clearly above the temperature at which the curable adhesive was applied to the parts to be bonded and at or above the temperature at which the hardener and/or accelerator and/or latent expanding agent (if present) are activated (i.e., in the case of the hardener, the minimum temperature at which the hardener becomes reactive towards the other components of the adhesive; in the case of the expanding agent, the minimum temperature at which the expanding agent causes foaming or expansion of the adhesive). Curing preferably takes place at a temperature above 150° C., for example at 160 to 170° C., for about 30 minutes.

Once cured, the adhesive compositions according to the present invention may be used as casting resins in the electrical or electronics industry or as die attach adhesives in electronics for bonding components to printed circuit boards. Further possible applications for the curable adhesives are as matrix materials for composites, such as fiber-reinforced composites. One particularly preferred application for the adhesives according to the present invention is the formation of structural bonds in vehicle construction.

In the embodiment of the invention wherein the curable adhesive contains one or more expanding agents, the adhesive may be utilized to form structural foams which serve to stiffen and reinforce cavities, gaps, structural members and the like. The curable adhesive may be supported or contained within a carrier or receptable or the like so as to position or orient the adhesive such that it expands in one or more particular directions when heated to induce curing and foaming. The curable adhesive thus is particularly useful in filling irregularly shaped spaces, as the adhesive will expand so as to come into contact with a greater portion of the substrate surfaces in the vicinity of the adhesive than would occur if no expanding agent was present. The foamed, cured adhesive stiffens and/or increases the energy absorption capacity of vehicle cavities and structural members.

EXAMPLE 1

Preparation of Epoxy-Based Prepolymer SF 65

The reaction products of linear and trifunctional ATPPG with DGEBA can be prepared separately or in the mixture. Epoxy-based prepolymers A to J were prepared from the following constituents, the formulation size being 1 kg in each case:

| Preparation of Epoxy-Based Prepolymers (in equivalents) | | | | | | | | | | |
|---|---|---|---|---|---|---|---|---|---|---|
| | EEW | AHEW | A | B | C | D | E | F | G | H | J |
| liquid DGEBA | 187 | | 0.765 | 0.765 | 0.765 | 0.765 | 0.69 | 0.765 | — | 1.785 | — |
| semisolid DGEBA | 255 | | — | — | — | — | — | — | 1.122 | — | 1.122 |
| solid DGEBA | 475 | | 0.765 | 0.765 | 0.765 | 0.765 | 0.692 | — | — | — | — |
| solid DGEBA | 537 | | — | — | — | — | — | 0.266 | — | — | — |
| CTBN adduct | 325 | | 0.17 | 0.17 | 0.17 | 0.17 | — | — | 0.147 | — | — |

-continued

Preparation of Epoxy-Based Prepolymers (in equivalents)

| | EEW | AHEW | A | B | C | D | E | F | G | H | J |
|---|---|---|---|---|---|---|---|---|---|---|---|
| CTBN adduct | 190* | | — | — | — | — | — | 0.125 | — | — | 0.125 |
| Dimeric fatty acid/ epoxy resin adduct | 650 | | — | — | — | — | 0.34 | — | — | — | — |
| Linear ATPPG | | 1000 | 0.44 | 0.43 | 0.44 | 0.43 | 0.43 | — | — | — | — |
| Linear ATPPG | | 500 | — | — | — | — | — | 0.334 | 0.286 | 0.238 | 0.334 |
| trifunct. ATPPG | | 500 | 0.08 | 0.023 | — | — | 0.013 | — | — | 0.048 | — |
| trifunct. ATPPG | | 75 | — | — | 0.011 | 0.023 | — | — | — | — | — |
| Viscosity at 80° C. [Pa · s] | | | 36 | 37 | 28 | 33 | 34 | 17 | 6.3 | 0.59 | 7.8 |

*5% CTBN, 95% DGEBA

The epoxy resins were melted at approximately 80° C. and introduced first into the kneader by means of a delivery screw, then the additional components were added and homogeneously mixed at 80° C.

Abbreviations used herein are defined as follows:

CTBN=carboxyl-terminated butadiene-nitrile rubber

ATPPG=amino-terminated polypropylene glycol

DGEBA=diglycidyl ether of bisphenol A

EEW=epoxide equivalent weight

AHEW=active hydrogen equivalent weight

TSS=tensile shearing strength

TPS=t-peel strength

SF-65=the epoxy-based prepolymer product resulting from the above procedure

EXAMPLE 2

Preparation of the Acrylate Terminated Urethane Resin

The NCO-reactive components (polyols) are mixed for 45 min at 90–100° C. and 0.1–2 mbar to remove water. The polyisocyanate is then added in one portion under nitrogen at 50° C. The reaction mixture is mixed under nitrogen at 70–80° C. to a constant NCO-value. Then the NCO-reactive acrylate is added together with a polymerization inhibitor. Dibutyltin dilaurate (0.01%) is added after 1 hour at 80° C. and the mixing is continued for additional 2 h, then the epoxy resin is added.

| Component | Weight in grams | Weight percent | Chemical name of component | Tradename of Company |
|---|---|---|---|---|
| Acrylate Terminated Urethane Resin A: | | | | |
| CAPA 305 | 275 | 10.7 | Polycaprolactone Polyol | Solvay Interox |
| CAPA 220 | 672 | 26.2 | Polycaprolactone Polyol | Solvay Interox |
| MDI | 538 | 21.0 | Methylenediphenyldi-isocyanate | |
| HPMA | 310 | 12.1 | Hydroxypropyl methacrylate | |
| EPON 828 | 769 | 30.0 | DGEBA | Resolution Performance Products |
| Acrylate Terminated Urethane Resin B: | | | | |
| PTHF 650 | 392 | 39.0 | Polytetrahydrofuran | |
| MDI | 225 | 22.4 | Methylenediphenyldi-isocyanate | |
| HPMA | 86 | 8.6 | Hydroxypropyl methacrylate | |
| EPON 828 | 301 | 30.0 | DGEBA | Resolution Performance Products |
| Acrylate Terminated Urethane Resin C: | | | | |
| PTHF 650 | 398 | 40.0 | Polytetrahydrofuran | |
| MDI | 225 | 22.6 | Methylenediphenyldi-isocyanate | |
| HEA | 73 | 7.3 | Hydroxyethyl acrylate | |
| EPON 828 | 298 | 30.0 | DGEBA | Resolution Performance Products |
| Acrylate Terminated Urethane Resin D: | | | | |
| CAPA 305 | 110 | 11.0 | Polycaprolactone Polyol | Solvay Interox |
| CAPA 220 | 267 | 26.7 | Polycaprolactone Polyol | Solvay Interox |
| MDI | 217 | 21.7 | Methylenediphenyldi-isocyanate | |
| HEA | 106 | 10.6 | Hydroxyethyl acrylate | |
| EPON 828 | 300 | 30.0 | DGEBA | Resolution Performance Products |
| Acrylate Terminated Urethane Resin E: | | | | |
| DYNACOLL 7250 | 612 | 61.2 | Polyester Polyol | Degussa |
| MDI | 59 | 5.9 | Methylenediphenyldi-isocyanate | |

-continued

| Component | Weight in grams | Weight percent | Chemical name of component | Tradename of Company |
|---|---|---|---|---|
| HEA | 29 | 2.9 | Hydroxyethyl acrylate | |
| EPON 818 | 300 | 30.0 | DGEBA | Resolution Performance Products |
| Acrylate Terminated Urethane Resin F: | | | | |
| DYNACOLL 7360 | 589 | 58.9 | Polyester Polyol | Degussa |
| MDI | 75 | 7.5 | Methylenediphenyldiisocyanate | |
| HEA | 36 | 3.6 | Hydroxyethyl acrylate | |
| EPON 828 | 300 | 30.0 | DGEBA | Resolution Performance Products |
| Acrylate Terminated Urethane Resin G: | | | | |
| PLURIOL P 900 | 551 | 45.4 | Polypropylene glycol | BASF |
| MDI | 225 | 18.5 | Methylenediphenyldiisocyanate | |
| HEA | 73 | 6.0 | Hydroxyethyl acrylate | |
| EPON 828 | 364 | 30.0 | DGEBA | Resolution Performance Products |
| Acrylate Terminated Urethane Resin H: | | | | |
| PLURIOL P 2000 | 1225 | 56.3 | Polypropylene glycol | BASF |
| MDI | 225 | 10.3 | Methylenediphenyldiisocyanate | |
| HEA | 73 | 3.4 | Hydroxyethyl acrylate | |
| EPON 828 | 653 | 30.0 | DGEBA | Resolution Performance Products |
| Acrylate Terminated Urethane Resin J: | | | | |
| PLURIOL P 900 | 551 | 46.8 | Polypropylene glycol | BASF |
| IPDI | 200 | 17.0 | Isophorone diisocyanate | |
| HEA | 73 | 6.2 | Hydroxyethyl acrylate | |
| EPON 828 | 353 | 30.0 | DGEBA | Resolution Performance Products |
| Acrylate Terminated Urethane Resin K: | | | | |
| PLURIOL P 2000 | 1225 | 57.2 | Polypropylene glycol | BASF |

-continued

| Component | Weight in grams | Weight percent | Chemical name of component | Tradename of Company |
|---|---|---|---|---|
| IPDI | 200 | 9.3 | Isophorone diisocyanate | |
| HEA | 73 | 3.4 | Hydroxyethyl acrylate | |
| EPON 828 | 642 | 30.0 | DGEBA | Resolution Performance Products |
| Acrylate Terminated Urethane Resin L: | | | | |
| PLURIOL P 900 | 551 | 49.8 | Polypropylene glycol | BASF |
| HDI | 151 | 13.6 | Hexamethylene diisocyanate | |
| HEA | 73 | 6.6 | Hydroxyethyl acrylate | |
| EPON 828 | 332 | 30.0 | DGEBA | Resolution Performance Products |
| Acrylate Terminated Urethane Resin M: | | | | |
| PLURIOL P 2000 | 425 | 54.8 | Polypropylene glycol | BASF |
| Trimethylol propane | 2.2 | 0.28 | | |
| HDI | 65 | 8.4 | Hexamethylene diisocyanate | |
| HEA | 51 | 6.6 | hydroxyethyl acrylate | |
| EPON 828 | 233 | 30.0 | DGEBA | Resolution Performance Products |
| Acrylate Terminated Urethane Resin N: | | | | |
| ANCAREZ 2364 | 1000 | 100.0 | Acrylate-functional urethane resin | Air Products |

EXAMPLE 3

Preparation of the Curable Adhesive

Curable adhesives are prepared by admixing SF-65 with an acrylate-terminated urethane resin and other components listed in Table 1 below with mixing for 45 minutes at a temperature controlled between 27–38 degrees C. (80–100 degrees F.) and pressure of 0.3–3 psi.

TABLE 1

(all amounts stated are in grams)

| Component/Adhesive | 1 | 2 | 3 | 4 | 5 | 6 | 7 | 8 | 9 | 10 | 11 | 12 |
|---|---|---|---|---|---|---|---|---|---|---|---|---|
| SF-65 A (Example 1) | 500 | | | | | | | | | 500 | 500 | 500 |
| SF-65 B (Example 1) | | 500 | | | | | | | | | | |
| SF-65 C (Example 1) | | | 500 | | | | | | | | | |
| SF-65 D (Example 1) | | | | 500 | | | | | | | | |
| SF-65 E (Example 1) | | | | | 500 | | | | | | | |
| SF-65 F (Example 1) | | | | | | 500 | | | | | | |
| SF-65 G (Example 1) | | | | | | | 500 | | | | | |
| SF-65 H (Example 1) | | | | | | | | 500 | | | | |
| SF-65 J (Example 1) | | | | | | | | | 500 | | | |
| Polydis 3604 | | | | | | | | | | | | |
| EPON 828 | 100 | 100 | 100 | 100 | 100 | 100 | 100 | 100 | 100 | 100 | 100 | 100 |
| EPON 834 | | | | | | | | | | | | |
| DER 351 | 100 | 100 | 100 | 100 | 100 | 100 | 100 | 100 | 100 | 100 | 100 | 100 |
| DER 354 | | | | | | | | | | | | |
| Resin A (Example 2) | | | | | | | | | | 100 | | |
| Resin B (Example 2) | | | | | | | | | | | 100 | |
| Resin C (Example 2) | | | | | | | | | | | | 100 |

TABLE 1-continued (all amounts stated are in grams)

| Component/Adhesive | 1 | 2 | 3 | 4 | 5 | 6 | 7 | 8 | 9 | 10 | 11 | 12 |
|---|---|---|---|---|---|---|---|---|---|---|---|---|
| Resin D (Example 2) | | | | | | | | | | | | |
| Resin E (Example 2) | | | | | | | | | | | | |
| Resin F (Example 2) | | | | | | | | | | | | |
| Resin G (Example 2) | | | | | | | | | | | | |
| Resin H (Example 2) | | | | | | | | | | | | |
| Resin J (Example 2) | 100 | 100 | 100 | 100 | 100 | 100 | 100 | 100 | 100 | | | |
| Resin K (Example 2) | | | | | | | | | | | | |
| Resin L (Example 2) | | | | | | | | | | | | |
| Resin M (Example 2) | | | | | | | | | | | | |
| Resin N (Example 2) | | | | | | | | | | | | |
| AMICURE CG 1400 | 50 | 50 | 50 | 50 | 50 | 50 | 50 | 50 | 50 | 50 | 50 | 50 |
| DE 83R | 20 | 20 | 20 | 20 | 20 | 20 | 20 | 20 | 20 | 20 | 20 | 20 |
| BUSAN 11-M1 | 10 | 10 | 10 | 10 | 10 | 10 | 10 | 10 | 10 | 10 | 10 | 10 |
| Calcium Oxide | 10 | 10 | 10 | 10 | 10 | 10 | 10 | 10 | 10 | 10 | 10 | 10 |
| MONARCH 280 | 5 | 5 | 5 | 5 | 5 | 5 | 5 | 5 | 5 | 5 | 5 | 5 |
| ULTRA PFLEX | 29 | 29 | 29 | 29 | 29 | 29 | 29 | 29 | 29 | 29 | 29 | 29 |
| DYHARD UR 300 | 6 | 6 | 6 | 6 | 6 | 6 | 6 | 6 | 6 | 6 | 6 | 6 |
| EXPANCEL 551 | 10 | 10 | 10 | 10 | 10 | 10 | 10 | 10 | 10 | 10 | 10 | 10 |
| Cab-O-Sil TS 720 | 30 | 30 | 30 | 30 | 30 | 30 | 30 | 30 | 30 | 30 | 30 | 30 |
| EPODIL 749 | 30 | 30 | 30 | 30 | 30 | 30 | 30 | 30 | 30 | 30 | 30 | 30 |

| Component/Adhesive | 13 | 14 | 15 | 16 | 17 | 18 | 19 | 20 | 21 | 22 | 23 | 24 |
|---|---|---|---|---|---|---|---|---|---|---|---|---|
| SF-65 A (Example 1) | 500 | 500 | 500 | 500 | 500 | 500 | 500 | 500 | 500 | 480 | | |
| SF-65 B (Example 1) | | | | | | | | | | | | |
| SF-65 C (Example 1) | | | | | | | | | | | 480 | |
| SF-65 D (Example 1) | | | | | | | | | | | | |
| SF-65 E (Example 1) | | | | | | | | | | | | |
| SF-65 F (Example 1) | | | | | | | | | | | | |
| SF-65 G (Example 1) | | | | | | | | | | | | |
| SF-65 H (Example 1) | | | | | | | | | | | | 480 |
| SF-65 J (Example 1) | | | | | | | | | | | | |
| Polydis 3604 | | | | | | | | | | 106 | 106 | 106 |
| EPON 828 | 100 | 100 | 100 | 100 | 100 | 100 | 100 | 100 | 100 | 106 | 106 | 106 |
| EPON 834 | | | | | | | | | | | | |
| DER 351 | 100 | 100 | 100 | 100 | 100 | 100 | 100 | 100 | 100 | | | |
| DER 354 | | | | | | | | | | | | |
| Resin A (Example 2) | | | | | | | | | | 89 | | |
| Resin B (Example 2) | | | | | | | | | | | | |
| Resin C (Example 2) | | | | | | | | | | | | |
| Resin D (Example 2) | 100 | | | | | | | | | | | |
| Resin E (Example 2) | | 100 | | | | | | | | | | |
| Resin F (Example 2) | | | 100 | | | | | | | | | |
| Resin G (Example 2) | | | | 100 | | | | | | | | |
| Resin H (Example 2) | | | | | 100 | | | | | | 89 | 89 |
| Resin J (Example 2) | | | | | | | | | | | | |
| Resin K (Example 2) | | | | | | | 100 | | | | | |
| Resin L (Example 2) | | | | | | | | 100 | | | | |
| Resin M (Example 2) | | | | | | | | | 100 | | | |
| Resin N (Example 2) | | | | | | | | | | 100 | | |
| AMICURE CG 1400 | 50 | 50 | 50 | 50 | 50 | 50 | 50 | 50 | 50 | 65 | 65 | 65 |
| DE 83R | 20 | 20 | 20 | 20 | 20 | 20 | 20 | 20 | 20 | | | |
| BUSAN 11-M1 | 10 | 10 | 10 | 10 | 10 | 10 | 10 | 10 | 10 | 37 | 37 | 37 |
| Calcium Oxide | 10 | 10 | 10 | 10 | 10 | 10 | 10 | 10 | 10 | | | |
| MONARCH 280 | 5 | 5 | 5 | 5 | 5 | 5 | 5 | 5 | 5 | 7 | 7 | 7 |
| ULTRA PFLEX | 29 | 29 | 29 | 29 | 29 | 29 | 29 | 29 | 29 | 300 | 300 | 300 |
| DYHARD UR 300 | 6 | 6 | 6 | 6 | 6 | 6 | 6 | 6 | 6 | 7 | 7 | 7 |
| EXPANCEL 551 | 10 | 10 | 10 | 10 | 10 | 10 | 10 | 10 | 10 | 8.4 | 8.4 | 8.4 |
| Cab-O-Sil TS 720 | 30 | 30 | 30 | 30 | 30 | 30 | 30 | 30 | 30 | 41 | 41 | 41 |
| EPODIL 749 | 30 | 30 | 30 | 30 | 30 | 30 | 30 | 30 | 30 | 37 | 37 | 37 |

| Component/Adhesive | 25 | 26 | 27 | 28 | 29 | 30 | 31 | 32 | 33 | 34 | 35 | 36 |
|---|---|---|---|---|---|---|---|---|---|---|---|---|
| SF-65 A (Example 1) | | | | | | | | | | 778 | | |
| SF-65 B (Example 1) | | | | | 230 | | | | | | | |
| SF-65 C (Example 1) | 480 | 480 | | | | | | | | | | |
| SF-65 D (Example 1) | | | | | | | | | | | | 865 |
| SF-65 E (Example 1) | | | | | | | | 500 | 500 | | | |
| SF-65 F (Example 1) | | | | | 190 | | | | | 628 | | |
| SF-65 G (Example 1) | | | | | | | | | | | | |
| SF-65 H (Example 1) | | | 480 | 480 | | | | | | | | |
| SF-65 J (Example 1) | | | | | | | 271 | | | | | |
| Polydis 3604 | 106 | 106 | 106 | 106 | 80 | 50 | | 90 | 90 | | | |
| EPON 828 | 106 | 106 | 106 | 106 | 150 | 200 | 388 | 600 | 600 | 600 | 250 | |
| EPON 834 | | | | | 60 | | | 120 | 120 | 108 | 100 | |
| DER 351 | | | | | 60 | | | | | | | 300 |
| DER 354 | | | | | | | 33 | | | | 100 | 200 |

TABLE 1-continued (all amounts stated are in grams)

| | | | | | | | | | | | | |
|---|---|---|---|---|---|---|---|---|---|---|---|---|
| Resin A (Example 2) | | | | | | | | | | | | |
| Resin B (Example 2) | | | | | | | | | | | | |
| Resin C (Example 2) | | 89 | 89 | | | | | | | | | |
| Resin D (Example 2) | | | | | | | | | | | | |
| Resin E (Example 2) | | | | | | | | | | | | |
| Resin F (Example 2) | | | | | | | | | | | | |
| Resin G (Example 2) | | | | 130 | | | | | | | | |
| Resin H (Example 2) | | | | | | | | | | | | |
| Resin J (Example 2) | | | | | | | | | | | | |
| Resin K (Example 2) | | | | | | | | | | | | |
| Resin L (Example 2) | | | | | | | | | | | | |
| Resin M (Example 2) | 89 | 89 | | | | | | | 200 | | 130 | 280 |
| Resin N (Example 2) | | | | | 80 | 50 | 200 | | 100 | | | |
| AMICURE CG 1400 | 65 | 65 | 65 | 65 | 55 | 50 | 57 | 100 | 100 | 110 | 90 | 100 |
| DE 83R | | | | | 15 | | 50 | | | 80 | 70 | 100 |
| BUSAN 11-M1 | 37 | 37 | 37 | 37 | 20 | 20 | 10 | 25 | 25 | 20 | 15 | 20 |
| Calcium Oxide | | | | | 20 | 10 | 5 | 20 | 20 | 10 | 20 | 15 |
| MONARCH 280 | 7 | 7 | 7 | 7 | 10 | 5 | 10 | 5 | 5 | 10 | 10 | 10 |
| ULTRA PFLEX | 300 | 300 | 300 | 300 | 180 | 300 | 80 | 213 | 213 | 127 | 146 | 158 |
| DYHARD UR 300 | 7 | 7 | 7 | 7 | 6 | 10 | 4 | 10 | 10 | 20 | 16 | 16 |
| EXPANCEL 551 | 8.4 | 8.4 | 8.4 | 8.4 | 8.8 | 9.5 | 7.8 | 13.4 | 13.4 | 18.8 | 19.1 | 17.8 |
| Cab-O-Sil TS 720 | 41 | 41 | 41 | 41 | 30 | 32 | 34 | 64 | 64 | 66 | 65 | 62 |
| EPODIL 749 | 37 | 37 | 37 | 37 | 15 | 20 | 10 | 40 | 40 | 20 | 50 | 50 |

| Component/Adhesive | 37 | 38 | 39 | 40 | 41 | 42 | 43 | 44 | 45 | 46 | 47 | 48 |
|---|---|---|---|---|---|---|---|---|---|---|---|---|
| SF-65 A (Example 1) | | | | | | | | | | | | 778 |
| SF-65 B (Example 1) | | | | | | | 230 | | | | | |
| SF-65 C (Example 1) | | | | | | | | | | | | |
| SF-65 D (Example 1) | 865 | | | | | | | | | | | |
| SF-65 E (Example 1) | | | | | | | | | 500 | 500 | | |
| SF-65 F (Example 1) | | | | | | 190 | | | | | 314 | |
| SF-65 G (Example 1) | | | | | | | | | | | | |
| SF-65 H (Example 1) | | | | | 480 | | | | | | | |
| SF-65 J (Example 1) | | | | | | | | 271 | | | | |
| Polydis 3604 | | 225 | 300 | 380 | 106 | 80 | 50 | | 90 | 90 | | |
| EPON 828 | | 615 | 800 | 800 | 106 | 150 | 200 | 388 | 600 | 600 | 300 | 250 |
| EPON 834 | | | | | | 60 | | | 120 | 120 | 54 | 100 |
| DER 351 | 300 | | | | | | | 60 | | | | |
| DER 354 | | 135 | | | | | | 33 | | | 50 | 200 |
| Resin A (Example 2) | | | | | | | | | | | | |
| Resin B (Example 2) | | | | | | | | | | | | |
| Resin C (Example 2) | | 150 | | | 89 | | | | | | | |
| Resin D (Example 2) | | | | | | | | | | | | |
| Resin E (Example 2) | | | | | | | | | | | | |
| Resin F (Example 2) | | | | | | | | | | | | |
| Resin G (Example 2) | | | | | | 130 | | | | | | |
| Resin H (Example 2) | | | | | | | | | | | | |
| Resin J (Example 2) | | | | | | | | | | | | |
| Resin K (Example 2) | | | | | | | | | | | | |
| Resin L (Example 2) | | | | | | | | | | | | |
| Resin M (Example 2) | | | 260 | | | | | | | 200 | | 130 |
| Resin N (Example 2) | 280 | | | 380 | | | 80 | 50 | 200 | | 50 | |
| AMICURE CG 1400 | 100 | 106 | 128 | 140 | 65 | 55 | 50 | 57 | 100 | 100 | 55 | 90 |
| DE 83 R | 100 | 60 | 100 | | | 15 | | 50 | | | 40 | 70 |
| BUSAN 11-M1 | 20 | 15 | 30 | 40 | 37 | 20 | 20 | 10 | 25 | 25 | 10 | 15 |
| Calcium Oxide | 15 | 15 | 10 | | | 20 | 10 | 5 | 20 | 20 | 29 | 20 |
| MONARCH 280 | 10 | 8 | 10 | 10 | 7 | 10 | 5 | 10 | 5 | 5 | 5 | 10 |
| ULTRA PFLEX | 158 | 150 | 260 | 100 | 300 | 180 | 300 | 80 | 213 | 213 | 50 | 146 |
| DYHARD UR 300 | 16 | 8 | 14 | 60 | 7 | 6 | 10 | 4 | 10 | 10 | 10 | 16 |
| EXPANCEL 551 | 17.8 | 8.0 | 14.2 | 13.8 | | | | | | | | |
| Cab-O-Sil TS 720 | 62 | 49 | 72 | 72 | 41 | 30 | 32 | 34 | 64 | 64 | 33 | 65 |
| EPODIL 749 | 50 | | | | 37 | 15 | 20 | 10 | 40 | 40 | | 50 |

| Component/Adhesive | 49 | 50 | 51 | 52 |
|---|---|---|---|---|
| SF-65 A (Example 1) | | | | |
| SF-65 B (Example 1) | | | | |
| SF-65 C (Example 1) | | | | |
| SF-65 D (Example 1) | 865 | | | |
| SF-65 E (Example 1) | | | | |
| SF-65 F (Example 1) | | | | |
| SF-65 G (Example 1) | | | | |
| SF-65 H (Example 1) | | | | |
| SF-65 J (Example 1) | | | | |
| Polydis 3604 | | 225 | 300 | 380 |
| EPON 828 | | 615 | 800 | 800 |

TABLE 1-continued (all amounts stated are in grams)

| Component | 1 | 2 | 3 | 4 |
|---|---|---|---|---|
| EPON 834 | | | | |
| DER 351 | 300 | | | |
| DER 354 | | 135 | | |
| Resin A (Example 2) | | | | |
| Resin B (Example 2) | | | | |
| Resin C (Example 2) | | 150 | | |
| Resin D (Example 2) | | | | |
| Resin E (Example 2) | | | | |
| Resin F (Example 2) | | | | |
| Resin G (Example 2) | | | | |
| Resin H (Example 2) | | | | |
| Resin J (Example 2) | | | | |
| Resin K (Example 2) | | | | |
| Resin L (Example 2) | | | | |
| Resin M (Example 2) | 280 | 260 | | |
| Resin N (Example 2) | | | 380 | |
| AMICURE CG 1400 | 100 | 106 | 128 | 140 |
| DE 83R | 100 | 60 | 100 | |
| BUSAN 11-M1 | 20 | 15 | 30 | 40 |
| Calcium Oxide | 15 | 15 | 10 | |
| MONARCH 280 | 10 | 8 | 10 | 10 |
| ULTRA PFLEX | 158 | 150 | 260 | 100 |
| DYHARD UR 300 | 16 | 8 | 14 | 60 |
| EXPANCEL 551 | | | | |
| Cab-O-Sil TS 720 | 62 | 49 | 72 | 72 |
| EPODIL 749 | 50 | | | |

TABLE 2

| Component | Chemical name of component | Tradename of Company |
|---|---|---|
| SF-65 | Epoxy-Based Prepolymer | |
| Polydis 3604 | CTBN-Epoxy adduct | Struktol |
| EPON 828 | diglycidylether of bisphenol A | Resolution Performance Products |
| EPON 834 | diglycidylether of bisphenol A | Resolution Performance Products |
| DER 351 | diglycidylether of bisphenol A and F | Dow Chemical |
| DER 354 | diglycidylether of bisphenol F | Dow Chemical |
| Resin A-N (Example 2) | acrylate terminated urethane resin | |
| AMICURE CG 1400 | Dicyandiamide | Air Products |
| DE 83R | decabromodiphenyl ether | Great Lakes Chemical Corp |
| BUSAN 11-M1 | Barium metaborate monohydrate | Buckman Laboratories |
| Calcium Oxide | Calcium Oxide | |
| MONARCH 280 | carbon black | Cabot |
| ULTRA PFLEX | coated precipitated calcium carbonate | Pfizer |
| DYHARD UR 300 | Fenuron | SKW Trostberg |
| EXPANCEL 551 | Poly(acrylonitrile-co-vinylidene chloride) shell, with isobutene encapsulated therein | Akzo Nobel |
| Cab-O-Sil TS 720 | treated fumed silica | Cabot |
| Epodil 749 | Neopentyl glycol diglycidyl ether | Air Products |

Curing: Fix bond with clips and place specimens for 20 min in an air-circulating oven at 160C.

Table 3 below describes the properties of the above described adhesives following curing.

TABLE 3

PROPERTIES

| Adhesive # | Viscosity (Flow at 80 psi, 0.104 inch) | Expansion @ 160 C./20 min. | Shear Strength w/oil 160 C. for 20 min. | T-Peel Strength w/oil 160 C. for 20 min. |
|---|---|---|---|---|
| 1 | 110 sec/20 gms @ 32.1 C. | AVE. = 97% | EZG: AVE. = 13.8 MPa | EZG: 151 N/25 mm |
| | 25.8 sec/20 gms @ 39.0 C. | | HDG: AVE. = 13.0 MPa | HDG: 133 N/25 mm |
| 2 | 138 sec/20 gms @ 33.3 C. | AVE. = 89% | EZG: AVE. = 9.1 MPa | EZG: 107 N/25 mm |
| | 31.4 sec/20 gms @ 40.1 C. | | HDG: AVE. = 6.6 MPa | HDG: 94 N/25 mm |
| 3 | 98.2 sec/20 gms @ 32.4 C. | AVE. = 99% | EZG: AVE. = 13.6 MPa | EZG: 150 N/25 mm |

TABLE 3-continued

PROPERTIES

| Adhesive # | Viscosity (Flow at 80 psi, 0.104 inch) | Expansion @ 160 C./20 min. | Shear Strength w/oil 160 C. for 20 min. | T-Peel Strength w/oil 160 C. for 20 min. |
|---|---|---|---|---|
|  | 20.8 sec/20 gms @ 38.4 C. |  | HDG: AVE. = 13.3 MPa | HDG: 138 N/25 mm |
| 4 | 107 sec/20 gms @ 32.0 C. | AVE. = 90% | EZG: AVE. = 11.4 MPa | EZG: 153 N/25 mm |
|  | 23.8 sec/20 gms @ 38.9 C. |  | HDG: AVE. = 10.0 MPa | HDG: 129 N/25 mm |
| 5 | 110 sec/20 gms @ 31.8 | AVE. = 103% | EZG: AVE. = 12.5 MPa | EZG: 147 N/25 mm |
|  | 20.0 sec/20 gms @ 39.5 C. |  | HDG: AVE. = 12.1 MPa | HDG: 130 N/25 mm |
| 6 | 59.9 sec/20 gms @ 32.0 C. | AVE. = 118% | EZG: AVE. = 13.5 MPa | EZG: 139 N/25 mm |
|  | 14.5 sec/20 gms @ 39.3 C. |  | HDG: AVE. = 12.1 MPa | HDG: 125 N/25 mm |
| 7 | 23.7 sec/20 gms @ 32.2 C. | AVE. = 79% | EZG: AVE. = 15.1 MPa | EZG: 126 N/25 mm |
|  | 7.3 sec/20 gms @ 39.5 C. |  | HDG: AVE. = 14.2 MPa | HDG: 112 N/25 mm |
| 8 | 10.1 sec/20 gms @ 32.5 | AVE. = 47% | EZG: AVE. = 18.6 MPa | EZG: 107 N/25 mm |
|  | 5.9 sec/20 gms @ 39.8 C. |  | HDG: AVE. = 12.7 MPa | HDG: 87 N/25 mm |
| 9 | 28.0 sec/20 gms @ 32.0 C. | AVE. = 81% | EZG: AVE. = 15.6 MPa | EZG: 118 N/25 mm |
|  | 9.4 sec/20 gms @ 39.1 C. |  | HDG: AVE. = 14.9 MPa | HDG: 102 N/25 mm |
| 10 | 100 sec/20 gms @ 32.2 C. | AVE. = 99% | EZG: AVE. = 14.4 MPa | EZG: 140 N/25 mm |
|  | 23.7 sec/20 gms @ 39.0 C. |  | HDG: AVE. = 13.8 MPa | HDG: 123 N/25 mm |
| 11 | 144 sec/20 gms @ 30.9 C. | AVE. = 106% | EZG: AVE. = 11.9 MPa | EZG: 135 N/25 mm |
|  | 26.1 sec/20 gms @ 40.2 C. |  | HDG: AVE. = 11.2 MPa | HDG: 122 N/25 mm |
| 12 | 138 sec/20 gms @ 31.5 C. | AVE. = 96% | EZG: AVE. = 14.1 MPa | EZG: 156 N/25 mm |
|  | 25.8 sec/20 gms @ 39.0 C. |  | HDG: AVE. = 13.5 MPa | HDG: 144 N/25 mm |
| 13 | 115 sec/20 gms @ 31.9 C. | AVE. = 99% | EZG: AVE. = 13.8 MPa | EZG: 150 N/25 mm |
|  | 29.8 sec/20 gms @ 38.1 C. |  | HDG: AVE. = 12.7 MPa | HDG: 135 N/25 mm |
| 14 | 96.0 sec/20 gms @ 31.3 C. | AVE. = 87% | EZG: AVE. = 8.1 MPa | EZG: 72 N/25 mm |
|  | 20.8 sec/20 gms @ 39.1 C. |  | HDG: AVE. = 8.3 MPa | HDG: 72 N/25 mm |
| 15 | 101.6 sec/20 gms @ 31.5 C. | AVE. = 92% | EZG: AVE. = 4.5 MPa | EZG: 58 N/25 mm |
|  | 23.0 sec/20 gms @ 39.0 C. |  | HDG: AVE. = 4.8 MPa | HDG: 53 N/25 mm |
| 16 | 95.6 sec/20 gms @ 32.3 C. | AVE. = 101% | EZG: AVE. = 16.8 MPa | EZG: 166 N/25 mm |
|  | 25.8 sec/20 gms @ 39.0 C. |  | HDG: AVE. = 14.3 MPa | HDG: 131 N/25 mm |
| 17 | 91.1 sec/20 gms @ 32.3 C. | AVE. = 108% | EZG: AVE. = 14.6 MPa | EZG: 170 N/25 mm |
|  | 25.4 sec/20 gms @ 37.8 C. |  | HDG: AVE. = 13.0 MPa | HDG: 143 N/25 mm |
| 18 | 101 sec/20 gms @ 32.2 C. | AVE. = 92% | EZG: AVE. = 13.0 MPa | EZG: 150 N/25 mm |
|  | 25.4 sec/20 gms @ 38.8 C. |  | HDG: AVE. = 13.0 MPa | HDG: 139 N/25 mm |
| 19 | 106 sec/20 gms @ 32.3 C. | AVE. = 95% | EZG: AVE. = 13.5 MPa | EZG: 148 N/25 mm |
|  | 28.1 sec/20 gms @ 38.5 C. |  | HDG: AVE. = 13.2 MPa | HDG: 135 N/25 mm |
| 20 | 136 sec/20 gms @ 32.4 C. | AVE. = 109% | EZG: AVE. = 15.2 MPa | EZG: 168 N/25 mm |
|  | 36.8 sec/20 gms @ 38.8 C. |  | HDG: AVE. = 14.5 MPa | HDG: 157 N/25 mm |
| 21 | 102 sec/20 gms @ 32.4 C. | AVE. = 97% | EZG: AVE. = 13.8 MPa | EZG: 148 N/25 mm |

TABLE 3-continued

PROPERTIES

| Adhesive # | Viscosity (Flow at 80 psi, 0.104 inch) | Expansion @ 160 C./20 min. | Shear Strength w/oil 160 C. for 20 min. | T-Peel Strength w/oil 160 C. for 20 min. |
|---|---|---|---|---|
| 22 | 22.0 sec/20 gms @ 40.0 C. 220 sec/20 gms @ 32.4 C. | AVE. = 112% | HDG: AVE. = 12.9 MPa EZG: AVE. = 16.9 MPa | HDG: 135 N/25 mm EZG: 131 N/25 mm |
| 23 | 40.1 sec/20 gms @ 38.6 C. 184 sec/20 gms @ 32.3 C. | AVE. = 116% | HDG: AVE. = 15.4 MPa EZG: AVE. = 15.7 MPa | HDG: 133 N/25 mm EZG: 129 N/25 mm |
| 24 | 31.8 sec/20 gms @ 38.4 C. 18.1 sec/20 gms @ 32.3 | AVE. = 116% | HDG: AVE. = 14.9 MPa EZG: AVE. = 17.6 MPa | HDG: 124 N/25 mm EZG: 118 N/25 mm |
| 25 | 8.7 sec/20 gms @ 39.8 C. 198 sec/20 gms @ 32.0 C. | AVE. = 90% | HDG: AVE. = 14.3 MPa EZG: AVE. = 16.6 MPa | HDG: 111 N/25 mm EZG: 125 N/25 mm |
| 26 | 40.0 sec/20 gms @ 38.3 C. 14.3 sec/20 gms @ 33.0 | AVE. = 107% | HDG: AVE. = 15.3 MPa EZG: AVE. = 17.8 MPa | HDG: 125 N/25 mm EZG: 120 N/25 mm |
| 27 | 8.8 sec/20 gms @ 39.2 C. 214 sec/20 gms @ 32.5 C. | AVE. = 92% | HDG: AVE. = 15.0 MPa EZG: AVE. = 15.4 MPa | HDG: 122 N/25 mm EZG: 133 N/25 mm |
| 28 | 40.8 sec/20 gms @ 38. C. 15.5 sec/20 gms @ 32.6 | AVE. = 102% | HDG: AVE. = 14.0 MPa EZG: AVE. = 17.0 MPa | HDG: 127 N/25 mm EZG: 109 N/25 mm |
| 29 | 9.5 sec/20 gms @ 38.8 C. 71.8 sec/20 gms @ 32.1 C. | AVE. = 98% | HDG: AVE. = 14.6 MPa EZG: AVE. = 16.8 MPa | HDG: 98 N/25 mm EZG: 129 N/25 mm |
| 30 | 23.8 sec/20 gms @ 39.2 C. 67.6 sec/20 gms @ 31.9 C. | AVE. = 107% | HDG: AVE. = 15.6 MPa EZG: AVE. = 16.5 MPa | HDG: 128 N/25 mm EZG: 130 N/25 mm |
| 31 | 23.3 sec/20 gms @ 39.0 C. 82.4 sec/20 gms @ 32.0 C. | AVE. = 103% | HDG: AVE. = 15.5 MPa EZG: AVE. = 16.9 MPa | HDG: 126 N/25 mm EZG: 125 N/25 mm |
| 32 | 27.5 sec/20 gms @ 39.2 C. 70.5 sec/20 gms @ 31.8 C. | AVE. = 96% | HDG: AVE. = 15.7 MPa EZG: AVE. = 16.7 MPa | HDG: 127 N/25 mm EZG: 132 N/25 mm |
| 33 | 20.9 sec/20 gms @ 39.2 C. 90.2 sec/20 gms @ 31.9 C. | AVE. = 92% | HDG: AVE. = 15.5 MPa EZG: AVE. = 17.3 MPa | HDG: 120 N/25 mm EZG: 138 N/25 mm |
| 34 | 24.7 sec/20 gms @ 39.1 C. 74.4 sec/20 gms @ 32.0 C. | AVE. = 106% | HDG: AVE. = 15.9 MPa EZG: AVE. = 16.7 MPa | HDG: 128 N/25 mm EZG: 130 N/25 mm |
| 35 | 17.4 sec/20 gms @ 39.3 C. 76.1 sec/20 gms @ 32.0 C. | AVE. = 103% | HDG: AVE. = 15.2 MPa EZG: AVE. = 14.7 MPa | HDG: 127 N/25 mm EZG: 150 N/25 mm |
| 36 | 19.0 sec/20 gms @ 39.4 C. 71.0 sec/20 gms @ 31.8 C. | AVE. = 100% | HDG: AVE. = 14.3 MPa EZG: AVE. = 15.9 MPa | HDG: 139 N/25 mm EZG: 132 N/25 mm |
| 37 | 15.5 sec/20 gms @ 39.3 C. 65.9 sec/20 gms @ 32.2 C. | AVE. = 105% | HDG: AVE. = 14.8 MPa EZG: AVE. = 16.1 MPa | HDG: 129 N/25 mm EZG: 130 N/25 mm |
| 38 | 14.1 sec/20 gms @ 39.0 C. 14.2 sec/20 gms @ 32.0 C. | AVE. = 117% | HDG: AVE. = 15.5 MPa EZG: AVE. = 16.6 MPa | HDG: 130 N/25 mm EZG: 100 N/25 mm |
| 39 | 4.3 sec/20 gms @ 39.1 C. 16.2 sec/20 gms @ 31.8 C. | AVE. = 121% | HDG: AVE. = 15.5 MPa EZG: AVE. = 16.9 MPa | HDG: 94 N/25 mm EZG: 113 N/25 mm |

TABLE 3-continued

PROPERTIES

| Adhesive # | Viscosity (Flow at 80 psi, 0.104 inch) | Expansion @ 160 C./20 min. | Shear Strength w/oil 160 C. for 20 min. | T-Peel Strength w/oil 160 C. for 20 min. |
|---|---|---|---|---|
| 40 | 6.6 sec/20 gms @ 39.0 C.<br>12.9 sec/20 gms @ 31.9 C. | AVE. = 106% | HDG: AVE. = 15.4 MPa<br>EZG: AVE. = 15.7 MPa | HDG: 102 N/25 mm<br>EZG: 130 N/25 mm |
| 41 | 4.0 sec/20 gms @ 38.7 C.<br>16.1 sec/20 gms @ 32.2 | | HDG: AVE. = 15.0 MPa<br>EZG: AVE. = 26.3 MPa | HDG: 121 N/25 mm<br>EZG: 186 N/25 mm |
| 42 | 9.1 sec/20 gms @ 39.0 C.<br>70.0 sec/20 gms @ 32.3 C. | | HDG: AVE. = 18.9 MPa<br>EZG: AVE. = 27.0 MPa | HDG: 164 N/25 mm<br>EZG: 201 N/25 mm |
| 43 | 23.5 sec/20 gms @ 39.0 C.<br>67.0 sec/20 gms @ 32.09 C. | | HDG: AVE. = 21.9 MPa<br>EZG: AVE. = 26.9 MPa | HDG: 172 N/25 mm<br>EZG: 190 N/25 mm |
| 44 | 24.7 sec/20 gms @ 38.8 C.<br>80.1 sec/20 gms @ 32.0 C. | | HDG: AVE. = 22.2 MPa<br>EZG: AVE. = 27.1 MPa | HDG: 166 N/25 mm<br>EZG: 196 N/25 mm |
| 45 | 31.9 sec/20 gms @ 39.0 C.<br>65.2 sec/20 gms @ 31.9 C. | | HDG: AVE. = 20.4 MPa<br>EZG: AVE. = 25.7 MPa | HDG: 167 N/25 mm<br>EZG: 202 N/25 mm |
| 46 | 19.7 sec/20 gms @ 39.0 C.<br>100.1 sec/20 gms @ 31.8 C. | | HDG: AVE. = 20.5 MPa<br>EZG: AVE. = 26.6 MPa | HDG: 160 N/25 mm<br>EZG: 196 N/25 mm |
| 47 | 28.1 sec/20 gms @ 38.7 C.<br>150.0 sec/20 gms @ 35.0 C. | | HDG: AVE. = 21.5 MPa<br>EZG: AVE. = 25.1 MPa | EZG: 191 N/25 mm |
| 48 | 76.8 sec/20 gms @ 39.2 C.<br>42.6 sec/20 gms @ 35.0 C. | | HDG: AVE. = 19.4 MPa<br>EZG: AVE. = 24.3 MPa | HDG: 168 N/25 mm<br>EZG: 203 N/25 mm |
| 49 | 19.5 sec/20 gms @ 39.2 C.<br>37.2 sec/20 gms @ 35.1 C. | | HDG: AVE. = 19.0 MPa<br>EZG: AVE. = 24.7 MPa | EZG: 223 N/25 mm |
| 50 | 15.5 sec/20 gms @ 39.3 C.<br>9.0 sec/20 gms @ 34.9 C. | | HDG: AVE. = 19.3 MPa<br>EZG: AVE. = 28.0 MPa | EZG: 167 N/25 mm |
| 51 | 4.5 sec/20 gms @ 39.0 C.<br>13.4 sec/20 gms @ 35.1 C. | | HDG: AVE. = 20.9 MPa<br>EZG: AVE. = 27.6 MPa | EZG: 188 N/25 mm |
| 52 | 6.2 sec/20 gms @ 38.9 C.<br>10.0 sec/20 gms @ 32.0 C.<br>4.0 sec/20 gms @ 38.7 C. | | HDG: AVE. = 22.7 MPa<br>EZG: AVE. = 25.6 MPa<br>HDG: AVE. = 21.8 MPa | EZG: 214 N/25 mm |

What is claimed is:

1. A one part curable adhesive comprising:

A) an epoxy-based prepolymer comprising the reaction product of
 (a) an epoxy resin; and
 (b) a co-reactant selected from the group consisting of amino-terminated polyethers, carboxyl-containing 1,3-diene/polar ethylenically unsaturated comonomer resins, and mixtures thereof, wherein said epoxy resin is in excess relative to said co-reactant;

B) an acrylate-terminated urethane resin comprising the reaction product of a polyfunctional isocyanate, a polyol having a number average molecular weight of at least about 400, and an isocyanate reactive (meth) acrylate; and C) a heat-activated latent curing agent.

2. The curable adhesive of claim 1 which additionally comprises an expanding agent.

3. The curable adhesive of claim 2 wherein the expanding agent comprises expandable hollow plastic microspheres.

4. The curable adhesive of claim 1 in which the acrylate-terminated urethane resin is produced by reacting the polyfunctional isocyanate and the polyol to form an isocyanate terminated urethane prepolymer and then reacting the isocyanate reactive (meth)acrylate with the isocyanate terminated urethane prepolymer.

5. The curable adhesive of claim 1 in which the polyol is selected from the group consisting of polypropylene polyols, polyester polyols, polycaprolactone polyols, polytetrahydrofuran polyols, and mixtures thereof.

6. The curable adhesive of claim 1 in which the polyfunctional isocyanate is an aromatic diisocyanate.

7. The curable adhesive of claim 1 in which the number average molecular weight of the polyol is from about 400 to about 4000.

8. The curable adhesive of claim 1 in which the epoxy resin is selected from the group consisting of diglycidyl ethers of bisphenol A and bisphenol F.

9. The curable adhesive of claim 1 in which the polyol is selected from the group consisting of polypropylene glycols, polyester polyols, polytetramethylene glycols, and mixtures thereof and the polyfunctional isocyanate is selected from the group consisting of 2,4 toluenediisocyanate, 2,6-toluenediisocyanate, methylenediphenyldiisocyanate, isophoronediisocyanate, hexamethylenediisocyanate, paraphenylenediisocyanate and mixtures thereof.

10. The curable adhesive of claim 1 in which the isocyanate reactive acrylates and methacrylates are selected from the group consisting of hydroxyalkyl acrylates, hydroxyalkyl methacrylates, and mixtures thereof.

11. The curable adhesive of claim 1 wherein at least a portion of the epoxy-based prepolymer comprises the reaction product of a diglycidyl ether of bisphenol A or bisphenol F and a carboxyl-terminated butadiene-nitrile rubber.

12. The curable adhesive of claim 1 which comprises at least one substituted guanidine heat-activated latent curing agent.

13. A curable adhesive comprising:
A) an epoxy-based prepolymer which comprises the reaction product of
  a. a first epoxy resin which is solid at room temperature and which is a diglycidyl ether of bisphenol A or bisphenol F, having an epoxide equivalent weight of from about 400 to about 700;
  b. a second epoxy resin which is liquid at room temperature and which is a diglycidyl ether bisphenol A or bisphenol F, having an epoxide equivalent weight of from about 150 to about 220; and
  c. an amino-terminated polyalkylene glycol selected from the group consisting of polyethylene and polypropylene glycols;
B) an acrylate terminated urethane resin which comprises the reaction product of an isocyanate terminated urethane prepolymer and an isocyanate reactive acrylate or methacrylate, wherein the isocyanate terminated urethane prepolymer is obtained by reaction of a polyol having a number average molecular weight of at least about 400 and a polyfunctional isocyanate;
C) a heat-activated latent curing agent; and
D) an expanding agent comprising hollow plastic microspheres.

14. A one-part curable adhesive which comprises:
A) a reaction product of a polyepoxide resin having at least two 1,2-epoxy groups per molecule with an amino-terminated polyalkylene glycol and, optionally, an epoxy adduct of a carboxyl-terminated butadiene-nitrile rubber, wherein said polyepoxide resin is in excess relative to said amino-terminated polyalkylene glycol;
B) an acrylate-terminated urethane resin which comprises the reaction product of an isocyanate terminated urethane prepolymer and an isocyanate reactive (meth) acrylate, wherein the isocyanate terminated urethane prepolymer is obtained by reaction of a polyol having a number average molecular weight of at least about 400 and a polyfunctional isocyanate; and
C) a heat-activated latent curing agent.

15. A curable adhesive which comprises:
A) an epoxy-based prepolymer comprising the reaction product of
  a. a first epoxy resin which is solid at room temperature and which is a diglycidyl ether of bisphenol A or bisphenol F, having an epoxide equivalent weight of from about 400 to about 700;
  b. a second epoxy resin which is liquid at room temperature and which is a diglycidyl ether of bisphenol A or bisphenol F, having an epoxide equivalent weight of from about 150 to about 220; and
  c. a co-reactant selected from the group consisting of amino-terminated polyalkylene glycols, carboxyl-terminated butadiene-nitrile resins, and mixtures thereof;
B) an acrylate-terminated urethane resin;
C) a heat-activated latent curing agent; and
D) an expanding agent comprising hollow microspheres.

16. A method of making a composite article which comprises: contacting a surface with the curable adhesive of claim 1 and curing the curable adhesive in contact with the surface to prepare a composite article.

17. The method of claim 16 in which the surface is metal or plastic.

18. The method of claim 16 in which at least two surfaces are contacted with the curable adhesive and cured in contact therewith.

19. The method of claim 16 in which the curable adhesive is flowed into contact with the surface at a temperature between about 10 and 50 degrees C.

20. The method of claim 16 in which the curable adhesive is flowed into contact with the surface at a temperature of about 20 and about 40 degrees C.

21. The method of claim 16 in which the curable adhesive contains expandable hollow plastic microspheres.

22. A curable adhesive comprising:
A) an epoxy-based prepolymer comprising the reaction product of
  (a) an epoxy resin; and
  (b) a co-reactant selected from the group consisting of amino-terminated polyethers, carboxyl-containing 1,3-diene/polar ethylenically unsaturated comonomer resins, and mixtures thereof;
B) an acrylate-terminated urethane resin comprising the reaction product of a polyfunctional isocyanate, a polyol having a number average molecular weight of at least about 400, and an isocyanate reactive acrylate or methacrylate;
C) a heat-activated latent curing agent; and
D) an expanding agent.

23. The curable adhesive of claim 22 wherein the expanding agent comprises expandable hollow plastic microspheres.

24. A curable adhesive comprising:
A) an epoxy-based prepolymer comprising the reaction product of
  (a) an epoxy resin; and
  (b) a co-reactant selected from the group consisting of amino-terminated polyethers, carboxyl-containing 1,3-diene/polar ethylenically unsaturated comonomer resins, and mixtures thereof, wherein at least a portion of the epoxy-based prepolymer comprises the reaction product of a diglycidyl ether of bisphenol A or bisphenol F and a carboxyl-terminated butadiene-nitrile rubber;

B) an acrylate-terminated urethane resin comprising the reaction product of a polyfunctional isocyanate, a polyol having a number average molecular weight of at least about 400, and an isocyanate reactive acrylate or methacrylate; and C) a heat-activated latent curing agent.

25. A curable adhesive comprising:

A) an epoxy-based prepolymer comprising the reaction product of
  (a) an epoxy resin; and
  (b) a co-reactant selected from the group consisting of amino-terminated polyethers, carboxyl-containing 1,3-diene/polar ethylenically unsaturated comonomer resins, and mixtures thereof;

B) an acrytate-terminated urethane resin comprising the reaction product of a polyfunctional isocyanate, a polyol having a number average molecular weight of at least about 400, and an isocyanate reactive acrylate or methacrylate; and C) a substituted guanidine heat-activated latent curing agent.

26. A method of making a composite article which comprises: contacting a surface with the curable adhesive of claim 16, wherein the curable adhesive is additionally comprised of expandable hollow plastic microspheres, and curing the curable adhesive in contact with the surface to prepare a composite article.

* * * * *

UNITED STATES PATENT AND TRADEMARK OFFICE
CERTIFICATE OF CORRECTION

PATENT NO. : 6,998,011 B2 Page 1 of 1
DATED : February 14, 2006
INVENTOR(S) : Schoenfeld et al.

It is certified that error appears in the above-identified patent and that said Letters Patent is hereby corrected as shown below:

<u>Column 32,</u>
Line 3, delete "acrytate-terminated" and insert -- acrylate-terminated --.

Signed and Sealed this

Twenty-third Day of May, 2006

JON W. DUDAS
*Director of the United States Patent and Trademark Office*